(No Model.) 2 Sheets—Sheet 1.

J. A. TILDEN.
CIRCUIT TESTING CHRONOGRAPH.

No. 342,481. Patented May 25, 1886.

WITNESSES.
J. M. Dolan
Fred. B. Dolan

INVENTOR.
James A. Tilden
by his attys
Clarke & Raymond (No Model.) 2 Sheets—Sheet 2.

J. A. TILDEN.
CIRCUIT TESTING CHRONOGRAPH.

No. 342,481. Patented May 25, 1886.

WITNESSES.
J. M. Dolan
Fred. B. Dolan

INVENTOR.
James A. Tilden
by his attys
Clarke & Raymond

UNITED STATES PATENT OFFICE.

JAMES A. TILDEN, OF HYDE PARK, MASSACHUSETTS.

CIRCUIT-TESTING CHRONOGRAPH.

SPECIFICATION forming part of Letters Patent No. 342,481, dated May 25, 1886.

Application filed February 28, 1885. Serial No. 157,323. (No model.)

*To all whom it may concern:*

Be it known that I, JAMES A. TILDEN, of Hyde Park, in the county of Norfolk and State of Massachusetts, a citizen of the United States, have invented a new and useful Improvement in Circuit-Testing Chronographs, of which the following is a full, clear, and exact description, reference being had to the accompanying drawings, forming a part of this specification, in explaining its nature.

In Letters Patent granted me July 8, 1884, No. 301,645, was described a system of fire-alarm and time-detector by which the visits of a watchman to different parts of a building provided with electric thermostat-circuits could be employed to test the condition of the circuits.

The present invention has for its object to make the clock of the thermostat system automatically test the condition of the circuits at any desired intervals.

Figures 1, 2:
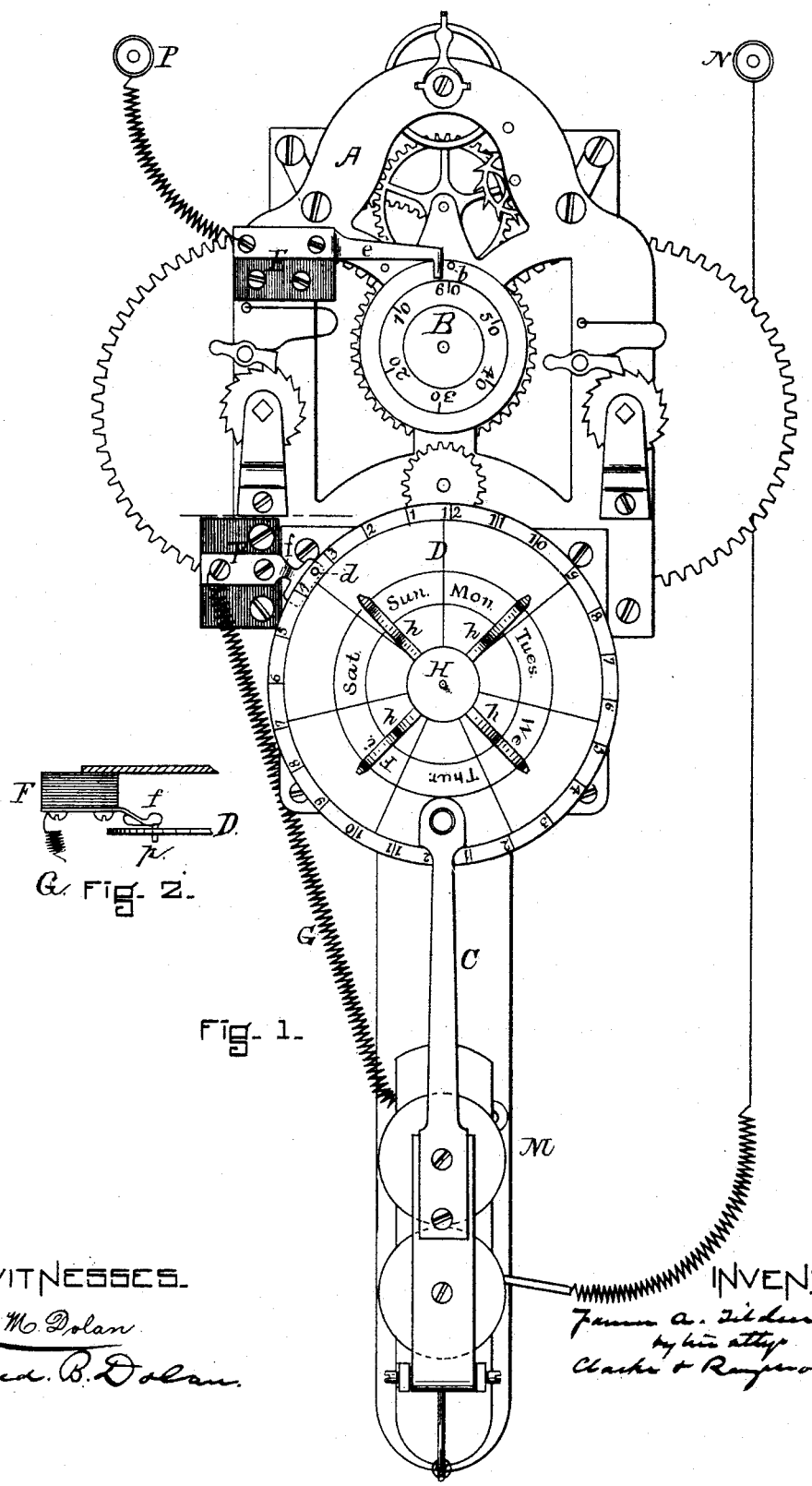
Figure 5:
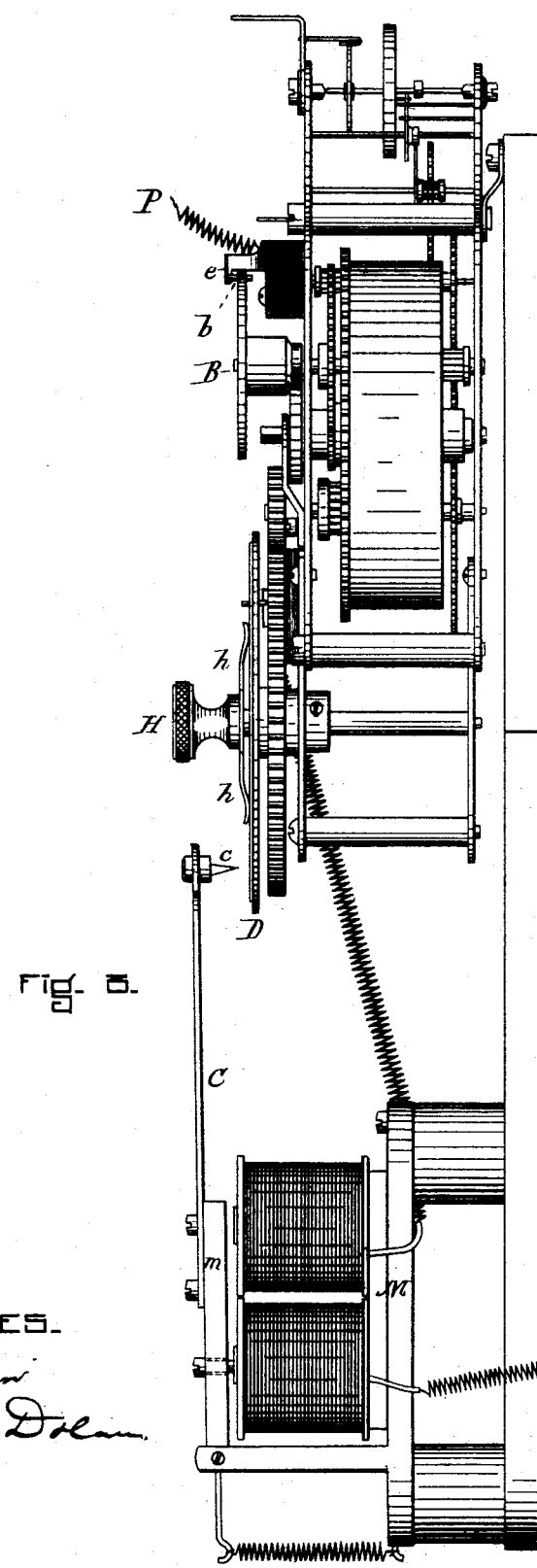

In the drawings, Figure 1 is a front elevation of the parts of a clock provided with this improvement. Fig. 2 is a plan detail on the line $x\ x$ of the contact-spring F. Fig. 3 is a side elevation of the clock.

The conducting-wires leading to the circuit are marked P and N. One of these wires leads to one pole of the battery and the other to the other pole, and the alarm apparatus may be of the usual form in these circuits, and the thermostats are arranged between the conducting-wires, so as to close the connection in case of fire.

The clock is an ordinary metallic clock having a frame, A. On the arbor of the minute-wheel is mounted a metallic disk, B, which revolves once in each hour. At some proper point in this disk is inserted a pin or other contacting conducting-wiper which shall once in each hour come in contact with a contact-spring, $e$, which is mounted upon the frame of the clock and insulated therefrom, as shown at E, Figs. 1 and 3. This will place the current having a tendency to move through the wire P in conducting relations through the spring $e$, the pin $b$, the metallic disk B, and its arbor and the train of wheels and frame of the clock with the disk D, which is so geared as to revolve once a day. In this disk D is a metallic pin, $d$, which projects downward from the disk D, and when it arrives opposite the point where contact-spring $f$ is located, which is insulated from the rest of the clock by the insulation F, the pin $d$ will make a metallic connection with the contact-spring $f$ and so place the current moving from P in a condition to travel through the conductor G to the magnet M and around the magnet M to the opposite pole of the circuit M N, thus exciting the magnet M and attracting its armature $m$ and actuating the chronograph-lever C to depress the point $c$ upon the dial of the wheel D and so make a record. This dial is a piece of paper laid upon the metallic surface of the disk D and fastened down to its place by a thumb-screw, H, and springs $h$, which hold the paper dial flat. This dial can be divided, as shown, into several sections indicating the days of the week, and may be shifted daily, so as to furnish a fresh space for the reception of the record.

In case several circuits were to be tested by the same chronograph one set of the wires of all the circuits could be brought together at the point N, the other set of wires being separated each from the other and provided with separate contact-springs like those shown at E, so as to test the several circuits successively, or different chronographs, magnets, and levers could be used for each circuit, or several contact-springs like those shown at F may be provided—one for each circuit—and the wires for all the circuits be brought to the point P, and the wires for all the circuits be separated at N and form independent connections with the magnet.

It is evident that by increasing the number of pins in the dial B more frequent tests can be made than once in twenty-four hours. The dial A may revolve once in twelve hours, instead of once in twenty-four hours, if properly geared, and so make the test once in twelve hours. It is also evident that in lieu of the dial B carrying a pin, $b$, a hand might be mounted on the same arbor, having a contact projection at the end to come in contact with the contact-spring $e$; and it is also evident that in lieu of having the contact-pin $d$ set in the dial D it may be similarly set in a revolving arm, the dial D remaining substantially stationary. It is also plain that any clock may be fitted with this appliance by attaching an insulated electric connection in the neighborhood of a revolving part and fitting that with a wiper and by annexing the recording device. One revolving wiper also will serve to test the circuit at regular intervals; but as this would throw the works of the clock into the circuit all the time I prefer the double insulation described.

By thus combining a watch-check and an automatic circuit-tester the rounds of a watchman to test the circuit are dispensed with.

Having thus fully described my invention, I claim and desire to secure by Letters Patent of the United States—

In combination with a clock, the chronograph-magnet M, and marker C, connected with the ends N P, of an electrical circuit through the insulated contact-springs $ef$ and the revolving electrical circuit-closers B D in conducting communication with each other, substantially as described.

JAMES A. TILDEN.

Witnesses:
F. F. RAYMOND, 2d,
THOS. WM. CLARKE.